(12) United States Patent
Xiang et al.

(10) Patent No.: US 10,579,030 B2
(45) Date of Patent: Mar. 3, 2020

(54) LIFTING DESK CONTROL METHOD

(71) Applicant: Loctek Inc., Fremont, CA (US)

(72) Inventors: Lehong Xiang, Ningbo Zhejiang (CN); Xiangming Zheng, Ningbo Zhejiang (CN); Shu Liu, Ningbo Zhejiang (CN)

(73) Assignee: LOCTEK INC., Fremont, CA (US)

( * ) Notice: Subject to any disclaimer, the term of this patent is extended or adjusted under 35 U.S.C. 154(b) by 0 days.

(21) Appl. No.: 16/390,422

(22) Filed: Apr. 22, 2019

(65) Prior Publication Data
US 2019/0369578 A1    Dec. 5, 2019

(30) Foreign Application Priority Data

May 31, 2018  (CN) .......................... 2018 1 0550877

(51) Int. Cl.
*G05B 17/02* (2006.01)
*A47B 21/02* (2006.01)

(52) U.S. Cl.
CPC .............. *G05B 17/02* (2013.01); *A47B 21/02* (2013.01); *A47B 2200/0056* (2013.01)

(58) Field of Classification Search
CPC .. G05B 17/02; A47B 21/02; A47B 2200/0056
USPC .................... 108/147, 50.01, 50.02
See application file for complete search history.

(56) References Cited

U.S. PATENT DOCUMENTS

| | | | | |
|---|---|---|---|---|
| 7,367,273 B2* | 5/2008 | Shinoda | ............... | A61B 6/0457 108/143 |
| 7,439,694 B2* | 10/2008 | Atlas | ........................ | A47B 9/04 108/146 |
| 7,478,601 B2* | 1/2009 | Stoops | ................. | B23Q 1/5475 108/20 |
| 7,953,509 B2* | 5/2011 | Murayama | ............... | B25J 9/107 108/1 |
| 8,505,137 B1* | 8/2013 | Gaines, Jr. | ........... | A61B 6/0457 108/147 |
| 8,826,830 B2* | 9/2014 | Pajic | .................. | B64D 11/0015 108/44 |
| 8,939,296 B2* | 1/2015 | Weyler | .................... | A47B 46/00 211/1.51 |
| 9,916,537 B2* | 3/2018 | Riquelme Ruiz | .... | A47B 21/007 |
| 10,004,329 B2* | 6/2018 | Nourse | ................... | A47B 21/06 |
| 10,126,720 B2* | 11/2018 | Liu | ........................ | F16M 11/10 |
| 2004/0211343 A1* | 10/2004 | Song | ....................... | A47B 21/00 108/50.01 |
| 2006/0137577 A1* | 6/2006 | Chang | ...................... | A61B 5/00 108/7 |

(Continued)

*Primary Examiner* — Jose V Chen
(74) *Attorney, Agent, or Firm* — Muncy, Geissler, Olds & Lowe, PC

(57) ABSTRACT

The invention provides a lifting desk control method including a motor drive unit, a current detection unit and an arithmetic unit. The control method comprises the steps of: detecting current a at the current time t1 and current b at time t2; calculating the current change rate L=(b−a)/(t2−t1); and comparing L with a set value, judging that an obstacle is encountered if the set value is exceeded, and issuing a stopping or retreating instruction to a motor by the motor drive unit. The scheme employed by the invention is to calculate the change rate of current, so judgment is made with higher accuracy and whether an obstacle is encountered is judged with high sensitivity.

2 Claims, 1 Drawing Sheet

(56) References Cited

U.S. PATENT DOCUMENTS

| | | | |
|---|---|---|---|
| 2009/0012634 A1* | 1/2009 | Koch | A47B 9/00 700/90 |
| 2009/0154079 A1* | 6/2009 | Bae | A47B 21/00 361/679.02 |
| 2013/0199421 A1* | 8/2013 | Hjelm | A47B 21/06 108/50.11 |
| 2014/0096706 A1* | 4/2014 | Labrosse | A47B 21/02 108/21 |
| 2014/0109802 A1* | 4/2014 | Dienes | A47B 9/00 108/50.11 |
| 2014/0137773 A1* | 5/2014 | Mandel | G06Q 10/109 108/50.11 |
| 2014/0208985 A1* | 7/2014 | DesRoches | A47B 21/02 108/20 |
| 2014/0208986 A1* | 7/2014 | DesRoches | A47B 9/20 108/22 |
| 2015/0007756 A1* | 1/2015 | Kollreider | A47B 9/04 108/21 |
| 2016/0213140 A1* | 7/2016 | Koch | A47C 3/20 |

\* cited by examiner

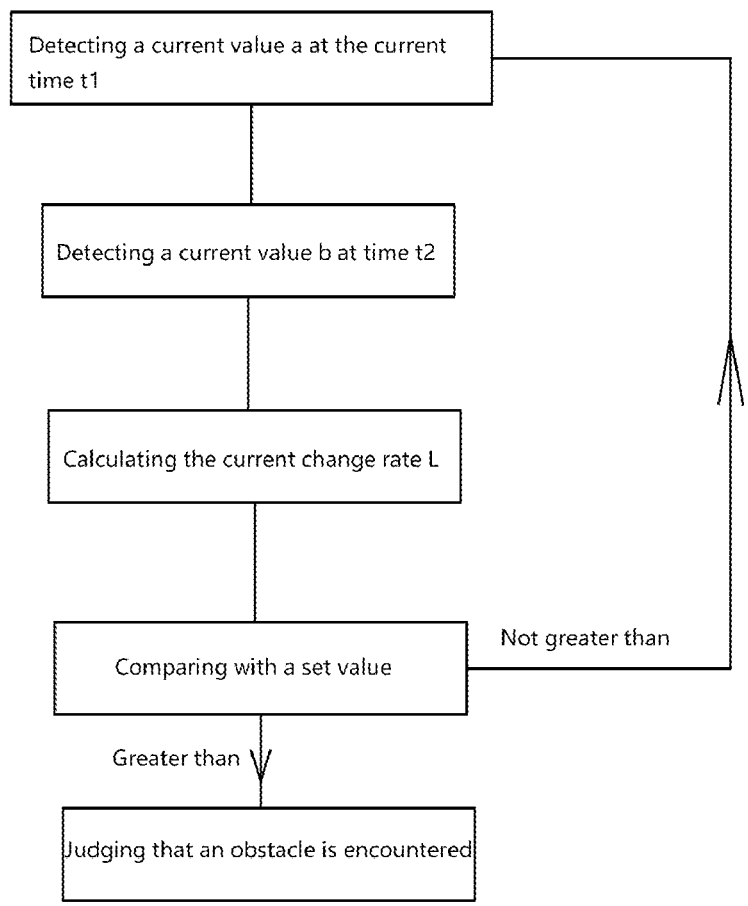

LIFTING DESK CONTROL METHOD

FIELD OF THE INVENTION

The invention relates to the field of lifting desk control, and in particular to a lifting desk control method.

BACKGROUND OF THE INVENTION

Electric lifting desks are generally used in homes or offices. When a user adjusts the height, if there is an obstacle, damage may be caused to the obstacle or the structure of a lifting desk. If the human body is collided, personal injury may be caused. In order to improve the product safety, the lifting desk product in the prior art may be additionally provided with a function of stopping or retreating in case of an obstacle.

Most of the lifting desk products on the market achieve the function of stopping or retreating in case of an obstacle by the following approaches: 1. whether an obstacle is encountered is judged by checking for an abrupt change in current during collision; 2. an obstacle is detected by a mechanical sensor such as a piezoelectric sensor or a spring; and 3. a three-axis acceleration sensor is used to detect whether the lifting desk has a rising obstacle to judge whether an obstacle is encountered. Abrupt current change detection is generally used for fixed obstacle detection, but has low sensitivity for the detection of resistance with a smaller force, for example, when a user presses a desktop and if only the magnitude of a current value is judged, the current value is not accurately judged due to different service conditions under different working conditions. Mechanical sensors have high mounting requirements and are not easy to produce. Three-axis acceleration sensors have high cost and tend to misjudgment.

SUMMARY OF THE INVENTION

A technical problem to be solved by the invention is to provide a lifting desk control method with high detection sensitivity and low cost for detecting whether a lifting desk encounters an obstacle.

To solve the above technical problem, the invention provides a lifting desk control method including a motor drive unit, a current detection unit and an arithmetic unit. The control method comprises the steps of:

step 1: detecting current a at the current time t1 and current b at time t2 after the current time by the current detection unit at a set time interval during normal operation, wherein the time t2 is later than the time t1;

step 2: calculating the current change value from t2 to t1 and the current change rate $L=(b-a)/(t2-t1)$ by the arithmetic unit; and step 3: comparing the current change rate L with a set value, judging that an obstacle is encountered if the set value is exceeded, and issuing a stopping or retreating instruction to a motor by the motor drive unit.

With the above-described structure, the invention has the following advantages compared with the prior art:

the scheme employed by the invention is to calculate the change rate of current, without the need to consider the magnitude of a current value during normal operation and the influence of the current operating conditions on the normal operating current, so judgment is made with higher accuracy; and the change speed of current is detected and hence protection is not required when the current rises to a set value, so whether an obstacle is encountered is judged with high sensitivity; and thirdly, no additional sensor is required and the cost is relatively low.

Preferably, the lifting desk control method is executed after the lifting desk is started for a period of time. Since the current changes greatly when the lifting desk is started, the control method is stopped at this time to avoid a false alarm using this step, and whether the lifting desk encounters an obstacle is judged during normal operation.

Preferably, the method further comprises the steps of; setting an upper threshold of a current value, and issuing a stopping or retreating instruction to the motor by the motor drive unit when the detected current value at any time exceeds the threshold. The overcurrent of the lifting desk can be protected by this step.

BRIEF DESCRIPTION OF THE DRAWINGS

The sole FIGURE is a flow diagram of a lifting desk control method of the invention.

DETAILED DESCRIPTION OF THE INVENTION

The invention will be further described below in detail with reference to particular embodiments.

As shown in the sole FIGURE, the invention provides a lifting desk control method including a motor drive unit, a current detection unit and an arithmetic unit, wherein the current detection unit is used for detecting the current of a motor and sending the value to the arithmetic unit, and the arithmetic unit is used for performing operation and sending a signal to the motor drive unit. The control method comprises the steps of:

step 1: detecting current a at the current time t1 and current b at time t2 after the current time by the current detection unit at a set time interval during normal operation, wherein the time t2 is later than the time t1;

step 2: calculating the current change value from t2 to t1 and the current change rate $L=(b-a)/(t2-t1)$ by the arithmetic unit; and step 3: comparing the current change rate L with a set value, judging that an obstacle is encountered if the set value is exceeded, and issuing a stopping or retreating instruction to a motor by the motor drive unit.

For example, in practical applications, the current at the current time t1 is detected to be 6 A every one second, time t2 is set to be later than the time t1 by 0.5 second and the current at the time t2 is 6.5 A, then the current change rate L at this time is calculated as $(6.5-6)/0.5=1$ A/s. The current change rate is greater than a set value of 0.3 A/s in the invention, then it is judged that an obstacle is encountered, and a stopping or retreating instruction is issued to the motor. Of course, the invention is not limited to the above set value. However, any method for judging whether the lifting desk encounters an obstacle by detecting the current change rate should fall within the protection scope of the invention.

The scheme employed by the invention is to calculate the change rate of current, without the need to consider the magnitude of a current value during normal operation and the influence of the current operating conditions on the normal operating current, so judgment is made with higher accuracy. For example, if the load of the lifting desk is small during normal operation, the normal operating current is also small; and if the load of the lifting desk is high during normal operation, the current value during normal operation is also high. Whether an obstacle is encountered is judged by a threshold of a current value for retreating in both cases, which may lead to misjudgment and affect normal use. However, when the current change rate is judged by the present method, normal operation is judged if the current change rate is below the threshold, which may not lead to misjudgment and provides higher accuracy.

Furthermore, in contrast, a method for directly detecting the current value requires the process in which the current rises to a set value, but the current rises rapidly when a fixed obstacle is encountered and a motor is stopped, while in case of an unfixed obstacle, e.g. a person, the lifting desk only has some resistance, but does not stop, and the current rises slowly at this time and hence it cannot be immediately judged that an obstacle is encountered. However, with the present method, as long as the rate at which the current changes exceeds the set value, it is judged that an obstacle is encountered, and the sensitivity far exceeds that of the method for directly detecting the current value.

Preferably, the lifting desk control method is executed after the lifting desk is started for a period of time. Since the current changes greatly when the lifting desk is started, the control method is stopped at this time to avoid a false alarm using this step, and whether the lifting desk encounters an obstacle is judged during normal operation. For example, in the invention, the lifting desk control method is set to be executed after the lifting desk is started for one second, thus avoiding a false alarm.

Preferably, the method further comprises the steps of: setting an upper threshold of a current value, and issuing a stopping or retreating instruction to the motor by the motor drive unit when the detected current value at any time exceeds the threshold. The overcurrent of the lifting desk can be protected by this step.

The invention claimed is:

1. A lifting desk control method, including a motor drive unit, a current detection unit and an arithmetic unit, the control method comprising steps of:
   step 1: detecting current a at current time t1 and current b at time t2 after the current time by a current detection unit at a set time interval during normal operation, wherein time t2 is later than time t1;
   step 2: calculating a current change value from time t2 to time t1 and a current change rate $L=(b-a)/(t2-t1)$ by the arithmetic unit;
   step 3: comparing the current change rate L with a set value, judging that an obstacle is encountered if the set value is exceeded, and issuing a stopping or retreating instruction to a motor by the motor drive unit; and
   step 4: if the set value is not exceeded, returning to the step 1 and continuing to detect a current value;
   wherein the lifting desk control method is executed after lifting desk is started for a period of time.

2. The lifting desk control method according to claim 1, further comprising steps of: setting an upper threshold of a current value, and issuing a stopping or retreating instruction to the motor by the motor drive unit when a detected current value at any time exceeds the upper threshold.

* * * * *